United States Patent [19]

Küpper et al.

[11] Patent Number: 4,912,249

[45] Date of Patent: Mar. 27, 1990

[54] ESTERS OF 3-TERT-BUTYL OR 3-TERT-BUTYL-5-ALKYL-4-HYDROXYL-PHENYL-(ALKANE) CARBOXYLIC ACIDS

[75] Inventors: Friedrich-Wilhelm Küpper, Marl; Heinz-Werner Voges, Dorsten; Werner Pätzold, Gladbeck; Richard Schaaf, Haltern, all of Fed. Rep. of Germany

[73] Assignee: Huels Aktiengesellschaft, Marl, Fed. Rep. of Germany

[21] Appl. No.: 123,425

[22] Filed: Nov. 18, 1987

[30] Foreign Application Priority Data

Nov. 18, 1986 [DE] Fed. Rep. of Germany ....... 3639374

[51] Int. Cl.$^4$ ............................................. C07C 69/88

[52] U.S. Cl. .................................... 560/067; 560/075; 524/219

[58] Field of Search ........................ 560/075; 180/067; 524/219

[56] References Cited

U.S. PATENT DOCUMENTS

| | | | |
|---|---|---|---|
| 4,594,444 | 10/1986 | Orban, I | 560/067 |
| 4,668,725 | 5/1987 | Broussand | 524/219 |
| 4,670,495 | 6/1987 | Evans | 524/155 |

Primary Examiner—Paul J. Killos
Attorney, Agent, or Firm—Millen, White & Zelano

[57] ABSTRACT

Useful for the stabilization of polymers, especially polypropylene and polyethylene are esters of 3-tert-butyl or 3-tert-butyl-5-alkyl-4-hydroxyphenyl(alkane) carboxylic acids with oxethylates of bis-(4- or 2-hydroxyphenyl) alkanes, oxides, sulfides or sulfones, with oxethylates of tris-(4-hydroxyphenyl) alkanes, or with oxethylates of 1,3,5-tris-(4-hydroxyphenyl isopropylidene) aryls, the oxethylate preferably comprising a hydroxyethoxy group substituted for each hydroxyl group.

18 Claims, No Drawings

ESTERS OF 3-TERT-BUTYL OR 3-TERT-BUTYL-5-ALKYL-4-HYDROXYLPHENYL(ALKANE) CARBOXYLIC ACIDS

CROSS-REFERENCE TO RELATED APPLICATION

This invention is related to applicant's concurrently filed application, attorney's docket HUELS 708, entitled "Esters of 3-tert-butyl- and 3-tert-butyl-5-alkyl-4-hydroxyphenyl (alkane) Carboxylic Acids With Oxethylates of Polyhydroxyaromatics, Process for Their Production, and Their Use as Stablizers", and coassigned filed application, attorney's docket HUELS 709, entitled "Esters of 3-tert-butyl- and 3-tert-butyl-5-alkyl-4-hydroxyphenyl (alkane) Carboxylic Acids With Oxyethylates of Polthiols".

BACKGROUND OF THE INVENTION

The present invention relates to esters of 3-tert-butyl- and 3-tert-butyl-5-alkyl-4-hydroxyphenyl (alkane) carboxylic acids, their preparation and their use as polymer stabilizers.

It is known that organic polymers as obtained by polymerization (or copolymerization) of mono- and diolefins, optionally containing functional groups, or by polycondensation of suitable precursors—for example, of diols with dicarboxylic acids—can suffer changes under the effect of air/oxygen, heat, light, or high-energy radiation; these changes impair the properties of the polymers important in their practical usage, such as strength, hardness and elongation. On account of such impairments, there is frequently not only a marked change in measurable physical properties, but also a visually noticable softening, brittleness and/or discoloration of the finished articles also occur. For this reason, stabilizers are added to the corresponding polymers prior to processing. For more details, see the review publications by G. Scott, "Atmospheric Oxidation and Antioxidants", Elsevier Publ. Co. Amsterdam, Oxford, N.Y. (1965); R. Gächter, H. Müller, "Taschenbuch der Kunststoff-Additive"[Pocket Manual of Plastics Additives], C. Hanser Publishers, Munich/Vienna (1979); J. Pospisil in "Degradation and Stabilization of Polymers" (Edit.: H. Jellinek), Elsevier, Amsterdam, Oxford, N.Y. (1983), pp. 193 et seq.; P. P. Klemchuk et al., "Polymer Degradation and Stabilization" 7: 131 et seq. (1984).

It is also known that in case of polyolefins, compounds containing phenolic hydroxy groups are preferably utilized as stabilizers, and that, among these phenol derivatives, materials having voluminous alkyl groups, preferably with tert-butyl substituents, in at least one ortho position with respect to the phenolic hydroxy group, exhibit a particularly high efficacy. Esters can also be found amoung the large number of stabilizers disclosed (compare, for example, J. C. Johnson, "Antioxidants", Noyes Data Corp., 1975; M. W. Ramsey, "Antioxidants-Recent Developments", Noyes Data Corp., 1979; M. T. Gillies, "Stabilizers for Synthetic Resins", Noyes Data Corp., Park Ridge, N.J., 1983). Esters of 3,5-dialkyl-4-hydroxyphenyl(alkane) carboxylic acids are described, for example, in U.S. Pat. Nos. 3,681,431; 3,330,859; 3,644,482; 3,285,855; 4,598,113; esters of 4,6-dialkyl-3-hydroxyphenyl(alkane) carboxylic acids are disclosed in U.S. Pat. Nos. 3,988,363; 3,862,130; and esters of 2-methyl-4-tert-butyl-5-hydroxyphenylalkane carboxylic acids are set forth in European Pat. No. 0.048,841.

The efficacy of the phenolic stabilizers can frequently be increased by adding specific compounds which in most cases contain sulfur or phosphorus. The optimum quantitative ratio of stabilizer and synergist is always to be found empirically in each individual instance.

The stabilizers as well as the synergists must meet the criteria that they can be incorporated without difficulties into the various polymers without decomposing, and that they can be distributed therein with maximum uniformity. On the other hand, the polymer should, at the required high incorporation temperatures, neither be discolored by additives nor suffer molecular weight degradation due to temperature load and shear stress.

In the literature, there are various stabilizer compounds disclosed which contain, besides sterically protected hydroxy phenyl groups, sulfur atoms which function synergistically in the same molecule (cf., e.g., R. W. Layer, "Non-staining Antioxidants" (in G. Scott, "Developments in Polymer Stabilization 4 (1981), p. 163 ff, p. 167); F. X. O'Shea in "Advances Chem. Series" 85 (1968), p. 128 ff; G. Scott in "Developments in Polym. Stabiliz." 6 (1983), p. 29 ff). In particular, derivatives of ortho-thiobisphenol are disclosed as strongly discoloring, and are probably used only for stabilizing rubber mixtures.

SUMMARY OF THE INVENTION

It is thus an object of this invention to provide improved stabilizers, their preparation and their use.

Upon further study of the specification and appended claims, further objects and advantages of this invention will become apparent to those skilled in the art.

These objects are attained by providing esters of 3-tert-butyl or 3-tert-butyl-5-alkyl-4-hydroxyphenyl(alkane) carboxylic acids of formula I

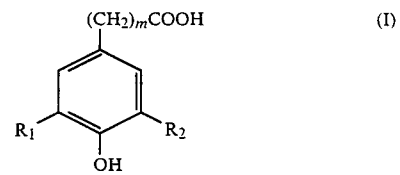

(I)

$R_1 = -C(CH_3)_3$,
$R_2 = H$, $C_1$ to $C_4$ alkyl, preferably $-C(CH_3)_3$,
$m = 0$ to 4, preferably 2, with oxethylates of bis-(4 or 2-hydroxyphenyl) alkanes, oxides, sulfides and sulfones, preferably with oxethylates of bis-(4-hydroxyphenyl) alkanes, oxides, sulfides or sulfones of formula II, with oxethylates of tris-(4-hydroxyphenyl) alkanes of formula IIIa or with oxethylates of 1,3,5-tris-(4-hydroxyphenyl isopropylidene) aryls of formula IIIb

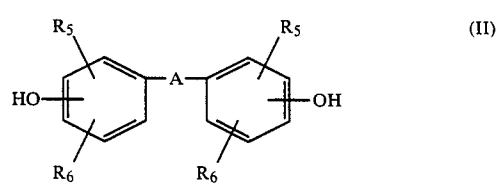

(II)

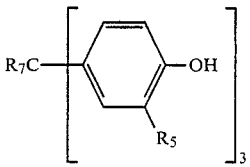

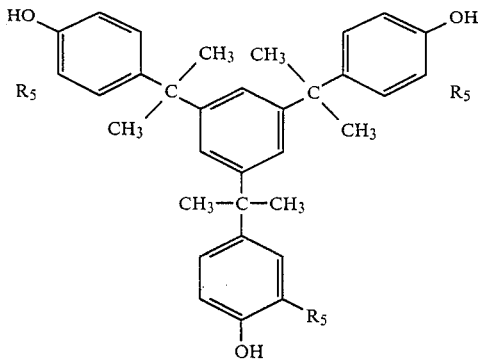

wherein A represents —CR₃R₄—, C₂ to C₁₂ alkanediyl, —O—, —OCH₂CH₂O—, —S—, —SCH₂CH₂S—, —SO₂—, —SO₂CH₂CH₂SO₂—, bis-isopropylidene aryl radicals (corresponding to 1,4- or 1,3-bis(1-methyl ethyl) aryl radicals wherein aryl preferably represents benzene, e.g.,

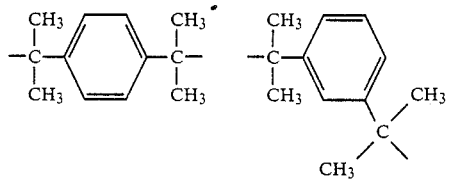

$R_3$, $R_4$ being identical or different each represents H, $C_1$ to $C_8$ alkyl, aryl, e.g., phenyl, 4-[(4-hydroxyphenyl)-isopropylidene] phenyl (corresponding to 4-[1-(4-hydroxyphenyl)-1-methyl ethyl] phenyl), $C_5$ to $C_{12}$ cycloalkyl, preferably alkyl, with the provision that $R_3$ and $R_4$ are other than $CH_3$ when $R_5$ and $R_6$ represent H; or $R_3$ and $R_4$ together with C represent an optionally alkyl-substituted cycloalkylidene of 5–12 carbon atoms, the optional alkyl group having preferably 1–15 carbon atoms, with the total number of carbon atoms being preferably not more than 12 carbon atoms;

$R_5$, $R_6$ being identical or different each represent H, $C_1$ to $C_4$ alkyl, $C_5$ to $C_{12}$ cycloalkyl or $C_1$ to $C_4$ alkoxyl and preferably H, with the provision that when $R_5$, $R_6$ is other than H in formula II, both substituents must not be in the o or o' position to the phenolic hydroxyl group;

$R_7$ represents H or $C_1$ to $C_8$ alkyl, and the oxethylates can contain a maximum of 3 alkylene oxide units of 2–8 carbon atoms in the alkylene unit, preferably ethylene oxide units, for examples oxides of formula V

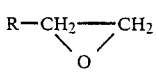

R = H, $C_1$ to $C_4$ alkyl, or aryl, e.g. phenyl.

This invention also provides a process for the production of these esters and the use of such esters for the stabilization of organic polymes, preferably polyolefins and polydienes, especially of polyethylene and polypropylene.

Starting from 3-tert-butyl or 3-tert-butyl-5-alkyl-4-hydroxyphenyl-(alkane) carboxylic acids or their derivatives, preferably 3,5-di-tert-butyl-4-hydroxyphenyl propionic acid (derivatives) known in the art, and reacting same with particular alcohols containing at least two hydroxyl groups and optionally sulfur as heteroatom to produce esters of these 3-tert-butyl or 3-tert-butyl-5-alkyl-4-hydroxyphenyl-(alkane) carboxylic acids of formula I with improved stabilizer properties. These esters are then worked into polyolefins and polydienes, preferably into polypropylene and polyethylene, to achieve a high degree of stabilization of such polymers with respect to molecular weight degradation during processing or during use over a prolonged period, without experiencing any appreciable discoloration as a result of the addition of the stabilizer.

As the polyhydric alcohol component of the ester, key to this invention are oxethylates of bis-(4 or 2-hydroxyphenyl) alkanes, oxides, sulfides and sulfones of formula II, preferably of bis-(4-hydroxyphenyl) alkanes, oxides, sulfides and sulfones or oxethylates of tris-(4-hydroxyphenyl) alkanes of formula IIIa or of 1,3,5-tris-(4-hydroxyphenyl isopropylidene) aryls of formula IIIb.

Preferred alcohols of formulae II and III contain an alkylene oxide unit per hydroxyl group so that each hydroxy is converted into HO—R—O— wherein R preferably is of 2 to 3 carbon atoms. Especially preferred are those alcohols having a 2-hydroxyethoxy group, i.e., HO—CH₂—CH₂—O—, each instead of any hydroxyl group in the compounds of formulae II or III.

The results of this invention are indeed surprising, since it would have been expected that the oxygen on the primary and secondary carbon atoms adjacent to the ether bond, precisely in the case of ethers containing alkyl(ene) radicals, would be readily attacked, leading to formation of hydroperoxides which frequently decompose at somewhat elevated temperatures, requiring a rigorous purification procedure for removal of such hydroperoxides before use of the ethers (cf. Houben-Weyl, "Methoden der organ. Chemie" [Methods of Organic Chemistry[, Vol. VI/3). Therefore, it could not be foreseen that the esters according to the invention based on oxethylates of bis-(4- or 2-hydroxyphenyl) alkanes and of heteroatom-containing analogs or of tris-(4-hydroxyphenyl) alkanes or 1,3,5-tris-(4-hydroxyphenyl-isopropylidene) aryls, would be stabilizers which could be mixed in at the high temperatures of polyolefin processing while retaining a high degree of activity and effecting surprisingly little discoloration of the resultant polymer materials. This is all the more surpising since commercially available esters of (dialkyl-4-hydroxyphenyl)-alkane-carboxylic acids with alpha,omega-bis-hydroxyethyl-(poly)-oxaalkanes containing ether groups of formula IV HO(CH₂)-$_n$(O(CH₂)$_m$)$_p$O(CH₂)$_l$OH (IV) with m, n, l=2, p≧0, producible according to the prior art, e.g., U.S. Pat. No. 3,285,855, lead to the discoloration of polyolefins, so that such commercial products are not recommended for this important field of use.

Also it is surprising that by the oxethylation of available bis-(4-hydroxyphenyl) alkanes and similar compounds of formulae II and III, already known as highly valuable precursors of high valued plastics (cf., e.g., Ullmann, "Enzyklopaedie der Tech. Chemie" [Encyclopedia of Industrial Chemistry], Vol. 18 (1979), p. 215 ff), the resultant esters of oxethylated compounds experience little or no cleavage during the esterification reaction or later use as stabilizers in polymers. This would have been expected in view of the known propensity of bis-(hydroxyphenyl)-alkanes to decompose into phenols and alkenylphenols under elevated temperatures and/or catalytic conditions.

It is still more surprising that by the two simple chemical reactions of oxethylation (i.e., of an ether formation) and esterification with special carboxylic acids of formula I, there are produced stabilizers having a stabilization effect (as shown in the examples herein) which is much higher than that of certain phenols, especially phenols carrying one or two bulky ortho-alkyl groups as taught by the prior art (cf. Ullmann, loc. cit., p. 216 and Vol. 8, p. 19 ff). It is also very unexpected that the stabilizers according to the invention exhibit little, if any, loss of activity, if the bis-(phenols) and tri-(phenols) of formulae II and III to be oxethylated do not contain the alkyl groups in the ortho postion to the phenolic hydroxyl group, as previously indicated to be necessary for their stabilization action. Conversely, the non-ortho position of the alkyl groups makes the oxethylation substantially easier.

Bis-(4- or 2-hydroxyphenyl) alkanes or cycloalkanes of formula II as well as tris-(4-hydroxyphenyl) compounds of formula III are preferred within the context of the invention as starting materials for the polyols to be esterified. Resultant preferred oxethylated compounds have in each instance, all the HO-groups substituted by an HO—$CH_2$—$CH_2$—O— group.

The esters to be used as stabilizers according to the invention, preferably for polypropylene and polyethylene, are novel compounds and are elucidated in the attached examples by melting point and spectroscopic studies. Such crystalline compounds are preferred over liquid stabilizers, since their uniform distribution in polymers such as polyethylene or polypropylene and the continuous addition of necessarily small amounts to the polymer powder generally cause fewer difficulties.

The production of the previously undescribed esters according to the invention can take place according to processes known in the art by reaction of reactive acids of formula I or functional acid derivatives thereof (e.g., methyl esters) with bifunctional or polyfunctional alcohols available by oxethylation of said initial materials of formulae II and III. These should contain at least two or three alkylene oxide units, preferably ethylene oxide units, and the ether bridges formed during oxethylation should be derived from two or three different hydroxyl groups. For oxethylation, the known processes of the prior art (cf., e.g., M. J. Schick, "Nonionic Surfactants," Marcel Dekker, N.Y. (1967), Vol. I, p. 57 ff), are used, according to which alkylene oxides of formula V

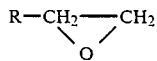
(V)

(R = H, $C_1$ to $C_4$ alkyl, or aryl, e.g. phenyl)

are added to the corresponding initial materials of formulae II and III. Many of the resultant alkoxylated compounds are novel, e.g., 1,1-Bis-(4-hydroxyphenyl)-cyclododecane or compounds of formula III.

Addition products of ethylene oxide, i.e., R represents H in formula V, are preferred as initial materials for the esters of 3-tert-butyl or 3-tert-butyl-5-alkyl-4-hydroxyphenyl-(alkane) carboxylic acids according to the invention. Very particularly preferred precursors are di- or (poly)-(monooxethylates) of bis-(4 or 2-hydroxyphenyl) alkanes, oxides, sulfides and sulfones or of tri-(4-hydroxyphenyl) alkanes and aryls, in which all phenolic hydroxyl groups are converted by the action of ethylene oxide into 2-hydroxy ethoxy groups. Separation of the desired diols or polyols from by-products possibly arising during oxethylation, as, polyglycols or higher oxethylates, can take place according to known processes of the prior art, i.e., e.g., by crystallization from suitable solvents (such as alcohols or ethers), by column chromatography. Some bis-(or poly)-(2-hydroxyethoxyaryl) alkanes, oxides, sulfides, sulfones and aryls corresponding to formulae II and III have been previously described in compounds (e.g. Beilstein, E III 6, p. 5461 and E IV 6, p. 5809, 5810).

There are preferred esters of 3-(3,5-di-tert-butyl-4-hydroxyphenyl) propionic acid of formula Ia

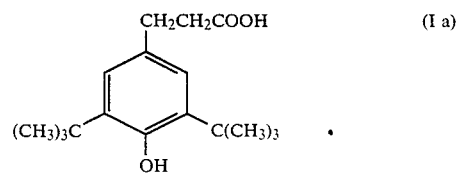
(I a)

with oxethylates of bis-(4-hydroxphenyl) alkanes, oxides, sulfides and sulfones of general formula II, preferably when A represents —$CR_3R_4$—, —O—, —S—, —$SO_2$— and $R_3$, $R_4$ representing H or $CH_3$ (with the provision that $R_3$ and $R_4$ does not represent $CH_3$, if $R_5$ and $R_6$ represent H); or aryl, e.g. phenyl, or —$CR_3R_4$— represents 1,1-cyclohexylidene or 1,1-cyclododecylidene. Other preferred esters are oxethylates of tris-(4-hydroxyphenyl) alkanes of formula IIIa or 1,3,5-tris-(4-hydroxyphenyl-isopropylidene) aryls (e.g., phenyls) of formula IIIb. Especially preferred are esters with oxethylates of compounds of formulae II and III, which contain an ethylene oxide unit (as 2-hydroxyethoxy group) each instead of the hydroxyl groups of the compounds of formulae II and III, especially esters with bis- or tris-(monooxethylates) of alpha,alpha'-bis-(4-hydroxyphenyl)-p-or m-diisopropyl benzene (i.e., 1,4- or 1,3-bis-[alpha-(4-hydroxyphenyl]-isopropylidene) benzene or 1,4- or 1,3-di-[1-(4-hydroxyphenyl)-1-methyl-ethyl]-phenylene, of 1,1-bis-(4-hydroxyphenyl) or 1,1-bis-(4-hydroxy-3-tert-butylphenyl)cyclohexane, of 1,1-bis-(4-hydroxyphenyl), of 1,1-bis-(4-hydroxy-3-methylphenyl) or of 1,1-bis-4-hydroxy-3-tert-butylphenyl) cyclododecane, of 1,1-bis-(4-hydroxyphenyl)-1-phenyl ethane, of 2,2-bis-(4-hydroxy-3-tert-butylphenyl) propane, of bis-(4-hydroxyphenyl) ether, of bis-(4-hydroxphenyl) sulfide, of bis-(4-hydroxyphenyl) sulfone, of tris-(4-hydroxyphenyl) methane, of 1,1,1-tris-(4-hydroxyphenyl) ethane and 1,3,5-tris-(4-hydroxyphenylisopropylidene) benzene.

The production of esters according to the invention is especially simple. The bis-(or poly-)(monooxethylates) which can be produced from the compounds of formulae II or III are, for example, transesterified with esters of 3-tert-butyl or 3-tert-butyl-5-alkyl-4-hydroxyphenyl-(alkane) carboxylic acids of formula I, preferably with esters of 3-[3,5-di-tert-butyl-4-hydroxyphenyl] propionic acid, which contain alkoxy groups with one to four C atoms. The transesterification is generally performed at elevated temperature, e.g., 100° to 150° C., preferably below 125° C. with the simultaneous release and removal of the more readily volatile alcohols. The direct reaction of diol (or polyol) and lower alkyl esters is often the most economical way, but it is also possible to operate in the presence of inert solvents or entraining agents for separation of the released alcohol. For acceleration of the transesterification, catalysts (preferably basic or neutral) according to the prior art are used, such as, e.g., i.e., sodium methylate, lithium amide, potassium tert-butylate, titanium tetrabutylate, aluminum triisopropylate. These are generally added in amounts of 0.1 to 5% by weight, in relation to the weight of the reaction mixture, and amounts of 0.5 to 1.5% by weight for reasons of reaction rate and costs are preferred The transesterification is suitably performed under inert gas or at reduced pressure, to avoid oxidation of the starting material and reaction products and to keep the reaction temperature relatively low, e.g., 100° to 140° C., especially in the presence of the transesterification catalysts. It is advantageous to use one of the starting materials in 10 to 20% molar excess of the necessary stoichiometric amount. The reaction is interrupted as soon as most of, if not all of, the stoichiometrically deficient component is consumed as indicated by analysis of the reaction mixture or by weighing of the separated alcohol. For this purpose, the catalyst is inactivated (i.e., in the case of basic or neutral catalysts, e.g., it is destroyed by addition of an equivalent amount of acid), the reaction mixture is worked up and the diol (or polyol) esters are purified by recrystallization from suitable solvents such as, e.g., alcohols, ethers or aromatic hydrocarbons. Then, the constitution of the compounds is confirmed by $^1$H-NMR spectroscopy based on the position and intensity of the different signals.

The 3-tert-butyl or 3-tert-butyl-5-alkyl-4-hydroxyphenyl-(alkane) carboxylic acid esters of bis- or poly-[4-or 2-(2'-hydroxyethoxy) aryl] alkanes, oxides, sulfides and sulfones or aryls are valuable stabilizers for polymers, preferably (co)polymers of monoolefins and-/or diolefins, especially of polypropylene and polyethylene. Other suitable polymers are e.g. polybutadiene, polystyrene and polylaurinlactame.

Stabilizers can be used not only as processing stabilizers, but also as long-term stabilizers. The addition to the polymers can be conducted according to known prior art processes by mixing of powdery polymers with the stabilizers or with a stabilizer concentrate (in the respective polymer), or the stabilizer can also be added to a suspension, emulsion or solution of the polymers before the working up process. The stabilizers are generally used in amounts of about 0.02 to 3% by weight of the material to be stabilized, but the optimal amount, easy to determine by a polymer chemist, fluctuates as a function of the polymer to be stabilized and the type of processing. An advantageous range is between 0.05 and 2% by weight of stabilizer addition, and in the case of polyolefins, an especially favorable range is 0.1 to 1% by weight. In any case, the stabilizer can comprise one or more individual esters. Furthermore, other additives such as, e.g., organic compounds containing sulfur and-/or phosphorus as synergists as well as different stabilizers not made according to the invention, plasticizers, pigments, UV stabilizers, anti-static agents, fillers and-/or processing auxiliary agents, such as calcium stearate, can also be incorporated and be worked into the polymers. The resultant polymers can in turn be processed by the injection-molding or extrusion process into finished products that can be used for many purposes.

Without being bound by an explanation of the mechanism of the stabilisation activity of the esters of the present invention, it is believed, that the stabilizers are useful for a broad variety of polymers.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

COMPARISON EXAMPLE 1 (NOT ACCORDING TO THE INVENTION)

Production of di-3-(3,5-di-tert-butyl-4-hydroxyphenyl) propionic acid ester of 2,2-bis-[4'-(2"-hydroxyethoxy) phenyl] propane 0.3 Mol (95 g) of commercial 2,2-bis-[4'(2"-hydroxyethoxy) phenyl] propane (Kodak company) is mixed with 0.64 mol (187 g) of 3-(3,5-di-tert-butyl-4-hydroxyphenyl) propionic acid methyl ester and 0.076 mol (4.1 g) of sodium methylate in a three-neck flask equipped with an internal thermometer, magnetic stirrer and Liebig condenser. The reaction mixtures is heated to 110° C. under inert gas in an apparatus with exclusion of moisture. After about one hour of reaction time the pressure is reduced step by step to about 0.2 hPa (mbar). The methanol distilling off is condensed and weighed for appraisal of the reaction achieved in the transesterification requiring about 4 to 5 hours. The content of the three-neck flask is taken up in about 300 ml of toluene, an approximately equivalent amount of glacial acetic acid (5% excess) is added to the sodium methylate catalyst and the toluene solution is then washed with sodium bicarbonate solution and water. After filtration and drying of the filtrate and drawing off of the toluene at reduced pressure, the unreacted or excessive 3-(3,5-di-tert-butyl-4-hydroxyphenyl) propionic acid methyl ester (bp about 130° C./0.05 hPa (mbar)) is separated in a vacuum from the viscous distillation residue. The nonvolatile portions of the reaction mixture consist mainly of the di-3-(3,5-di-tert-butyl-4-hydroxyphenyl) propionic acid ester of 2,2-bis-(4-2"-hydroxyethoxy)-phenyl] propane. By addition of a small amount of tetrahydrofuran this ester can be brought to crystallization. The resulting raw product is purified by recrystallization from ethanol up to melting point constancy, the purity achieved is checked by thin-layer chromatography (TLC).

Yield: 123 g of di-ester (=49% of theory)
Melting point: 103.5° to 105° C.
purity: 98% (according to TLC)

The constitution of the compound is verified by the intensity and position of the absorpiton lines of the $^1$H NMR spectrum. (Cf. table I, which contains greater details on the spectra of the esters according to the invention (taken up with TMS (tetramethylsilane) as the internal standard in CDCl₃).

EXAMPLES 2 to 11 (NOT ACCORDING TO THE INVENTION)

Production of different bis-[4-or 2-(2'-hydroxyethoxy) phenyl] alkanes, oxides, sulfides and sulfones as well as of tris-[4-(2'-hydroxyethoxy) phenyl] methane and 1,3,5-tris-[4-2'-hydroxyethoxy) phenyl-isopropylidene] benzene.

According to known processes for oxethylation of phenols (cf., e.g., M. J. Schick, loc. cit.) 1,1-bis-(4-hydroxyphenyl) cyclohexane (≃bisphenol Z; example 2), alpha,alpha'-bis-(4-hydroxyphenyl)-p-diisopropyl benzene (≃bisphenol D; example 3); 1,1-bis-(4-hydroxyphenyl)-1-phenyl ethane (example 4); bis-(2-hydroxy-3-cyclohexyl-5-methyl-phenyl) methane (example 5), 1,1-bis-(4-hydroxyphenyl) cyclododecane (example 6); bis-(4-hydroxyphenyl) ether (example 7); bis-(4-hydroxyphenyl) sulfide (example 8), bis-(4-hydroxyphenyl) sulfone (example 9), tris-(4-hydroxyphenyl) methane (≃leucoaurin; example 10) and 1,3,5-tris-(4-hydroxyphenyl-isopropylidene) benzene (example 11) is reacted with ethylene oxide in the presence of catalytic amounts of sodium hydroxide. In this case. solutions of bis- or tris-(4- or 2-hydroxyphenyl) compounds in diethylene glycol dimethyl ether are brought to reaction with ethylene oxide under pressure until a mole of ethylene oxide each is taken up per mole of hydroxyl groups in the initial compounds. After cooling, neutralizing of the catalyst used with an equivalent amount of glacial acetic acid and drawing off of all or part of the solvent, crystalline precipitates are formed—optionally after prolonged standing at 0° C. The raw products are recrystallized from suitable solutions, generally methanol, ethanol or ethers. In all cases colorless crystals are obtained, whose melting points are listed in Table II, which also contains data on yields and solvents. Since some of these compounds have not been previously described, their constitution and purity are checked by ¹H NMR spectroscopy before further use.

EXAMPLE 12

Production of bis-[3-(3,5-di-tert-butyl-4-hydroxyphenyl) propionic acid] ester of 1,1-bis-[4'-(2''-hydroxyethoxy) phenyl] cyclohexane.

According to the procedure described in example 1, 0.25 mol (89.1 g) of 1,1-bis-[4'-(2''-hydroxyethoxy) phenyl] cyclohexane, which was produced according to example 2, is transesterified in the presence of 0.044 mol (2.35 g) of sodium methylate with 0.53 mol (155 g) of 3-(3,5-di-tert-butyl-4-hydroxyphenyl) propionic acid methyl ester at 110° C. for 6.5 hours. After working up and removal of unreacted or excess initial materials under reduced pressure, a glasslike residue is obtained. Recrystallization from butanol yields the bis-ester according to the invention in high purity.

Yield: 156.6 g of bis-ester (=71.4% of theory)
Melting point: 128° to 131° C.
Purity: about 95% (according to NMR)
The constitution of the compound is verified by the position and intensity of the absorption lines of the ¹H NMR spectrum. (For details, cf. Table I.)

EXAMPLE 13

Production of bis-[3-(3,5-di-tert-butyl-4-hydroxyphenyl) propionic acid] ester of alpha,alpha'-bis-[4-(2'-hydroxyethoxy) phenyl]-p-diisopropyl benzene.

According to the procedure described in example 1, 0.21 mol (91.3 g) of the alpha,alpha'-bis-[4-(2'-hydroxyethoxy) phenyl]-p-diisopropyl benzene produced according to example 3 is transesterified in the presence of 0.076 mol (4.1 g) of sodium methylate with 0.45 mol (131.6 g) of 3-(3,5-di-tert-butyl-4-hydroxyphenyl) propionic acid methyl ester at 110° C. within 8.5 hours. After working up and removal of unreacted or excess initial materials under reduced pressure, a viscous oil is obtained, which solidifies after cooling to ≦0° C. and addition of a little ethanol. Recrystallization from ethanol yields the bis-ester according to the invention.

Yield: 152.4 g of bis-ester (=72.8% of theory)
Melting point: 127° to 128° C.
Purity: 88% (according to TLC)
The constitution of the bis-ester is verified by the position and intensity of the absorpiton lines of the ¹H NMR sprectrum. (Cf. Table I).

EXAMPLE 14

Prodcuction of bis-[3-(3,5-di-tert-butyl-4-hydroxyphenyl) propionic acid] ester of 1,1-bis-[4'-(2''-hydroxyethoxy) phenyl]-1-phenyl ethane According to the procedure described in example 1, 0.23 mol (87 g) of 1,1-bis-[4'-(2''-hydroxyethoxy) phenyl]-1-phenyl ethane, obtained according to example 4, is transesterified with 0.49 mol (143.3 g) of 3-(3,5-di-tert-butyl-4-hydroxyphenyl) propionic acid methyl ester at 115° C. within 8 hours in the presence of 0.01 mol (3.5 g) of titanium tetrabutylate. The similar working up yields a raw product, from which the bis-ester according to the invention is obtained after recrystallization.

Yield: 183.6 g of bis-ester (=88% of theory)
Melting point: 83° to 85° C. (from cyclohexane)
Purity: ≧95% (according to NMR)
The constitution of the bis-ester is verified by the position and intensity of the absorption lines of the ¹H NMR spectrum (cf. Table I).

EXAMPLE 15

Production of bis-[3-(3,5-di-tert-butyl-4-hydroxyphenyl) propionic acid] ester of bis-[2-(2'-hydroxyethoxy)-3-cyclohexyl-5-methyl phenyl] methane Bis-[2-(2'-hydroxyethoxy)-3-cyclohexyl-5-methyl phenyl] methane (0.2 mol; 94.9 g) obtained according to example 5 is transesterified according to the procedure described in example 1 in the presence of 0.076 mol (4.1 g) of sodium methylate at 125° C. within 6 hours with 0.43 mol (125.7 g) of 3-(3,5-di-tert-butyl-4-hydroxyphenyl) propionic acid methyl ester. After similar working up (and removal of unreacted or excess initial materials), a viscous mass is obtained, from which after prolonged time a crystalline raw product can be isolated. Recrystallization from methanol leads to a pure bis-ester according to the invention.

Yield: 141.1 g (=71.7% of theory)
Melting point: 113° to 117° C.

Purity: 96% (according to TLC)

The constitution of the bis-ester is verified by the position and intensity of the absorption lines of the $^1$H NMR spectrum (cf. Table I).

EXAMPLE 16

Product of bis-[3-(3,5-di-tert-butyl-4-hydroxyphenyl) propionic acid] ester of 1,1-bis-[4''-(2''-hydroxyethoxy) phenyl] cyclododecane According to the procedure described in example 1, 0.21 mol (95. g) of 1.1-bis-[4'-(2''-hydroxyethoxy) phenyl] cyclododecane, which was produced according to example 6 (not according to the invention), is transesterified, with addition of 0.01 mol (3.5 g) of titanium tetrabutylate within 7.5 hours at 125° C. with 0.45 mol (131.6 g) of 3-(3,5-di-tert-butyl-4-hydroxyphenyl) propionic acid methyl ester. After similar working up and removal of unreacted or excess initial materials under reduced pressure, a viscous product is obtained, which solidifies on cooling. The glasslike residue consists of the bis-enter according to the invention.

Yield: 194.8 g of bis-ester (=95% of theory)
Purity: ≧95% according to $^1$H NMR
Melting point: 72° to 78° C.

The constitution of the bis-ester is verified by the position and intensity of the signals of the $^1$H NMR spectrum (cf. Table I).

EXAMPLE 17

Production of bis-[3-(3,5-di-tert-butyl-4-hydroxyphenyl) propionic acid] ester of bis-[4-(2'-hydroxyethoxy) phenyl] ether According to the procedure described in example 1, 0.45 mol (129.3 g) of bis-[4-(2'-hydroxyethoxy) phenyl] ether, which was produced according to example 7, is transesterified, with addition of 0.076 mol (4.1 g) of sodium methylate, with 0.72 mol (210.5 g) of 3-(3,5-di-tert-butyl-4-hydroxyphenyl) propionic acid methyl ester at 110° C. within 6 hours. Similar working up after removal of unreacted or excess initial materials under reduced pressure yields a viscous oil. After prolonged standing at 20° C. and addition of a little methyl tert-butyl ether, crystals are obtained, which are recrystallized from methanol and consist of bis-ester according to the invention. Its constitution is confirmed by $^1$H NMR analysis (cf. Table I).

Yield: 104.3 g (=35.7% of theory)
Melting point: 80° to 81° C.
Purity: 97.5% (according to TLC)

EXAMPLE 18

Production of bis-[3-(3,5-di-tert-butyl-4-hydroxyphenyl) propionic acid] ester of bis-[4-(2'-hydroxyethoxy) phenyl] sulfide According to the procedure described in example 1, 0.24 mol (73.5 g) of bis-[4-2'-hydroxyethoxy) phenyl] sulfide, which was synthesized according to example 8, is transesterified, in the presence of 0.076 mol (4.1 g) sodium methylate, with 0.51 mol (149.1 g) of 3-(3,5-di-tert-butyl-4-hydroxyphenyl) propionic acid methyl ester at 115° C. within 5.75 hours. Working up and removal of unreacted initial materials under reduced pressure lead to a glasslike residue. After recrystallization from toluene, the raw product yields the bis-ester according to the invention.

Yield: 169.5 g (=85.4% of theory)
Melting point: 80° to 82° C.
Purity: 92% (according to TLC)

The constitution of the bis-ester according to the invention is verified by the position and intensity of the absorption lines of the $^1$H NMR spectrum (cf. Table I for details).

EXAMPLE 19

Production of bis-[3-(3,5-di-tert-butyl-4-hydroxyphenyl) propionic acid] ester of bis-[4-(2'-hydroxyethoxy) phenyl] sulfone According to the procedure described in example 1, 0.25 mol (84.6 g) of bis-[4-(2'-hydroxyethoxy) phenyl] sulfone, which was produced according to example 9, is transesterified, in the presence of 0.076 mol (4.1 g) of sodium methylate at 130° to 140° C. within 5.5 hours, with 0.53 mol (155 g) of 3-(3,5-di-tert-butyl-4-hydroxyphenyl) propionic acid methyl ester. A working up similar to example 1, after removal of unreacted or excess initial materials under reduced pressure, yields an oil. It solidifies after addition of a little methanol and prolonged standing at 20° C. After recrystallization from methanol, the raw product yields the bis-ester according to the invention, whose constitution is confirmed by $^1$H NMR spectroscopy (cf. Table I).

Yield: 139.4 g (=65% of theory)
Melting point: 129° to 131° C.
Purity: 91% (according to TLC)

EXAMPLE 20

Production of tris-[3-(3,5-di-tert-butyl-4-hydroxyphenyl) propionic acid] ester of tris-[4-(2'-hydroxyethoxy) phenyl] methane According to the procedure described in example 1, 0.17 mol (72.2 g) of tris-[4-(2'-hydroxyethoxy) phenyl] methane, which was produced according to example 10 not according to the invention, is transesterified, in the presence of 0.01 mol (3.5 g) of titanium tetrabutylate at 120° C. within 5 hours, with 0.54 mol (157.9 g) of 3-(3,5-di-tert-butyl-4-hydroxyphenyl) propionic acid methyl ester. After similar working up and removal of unreacted or excess initial materials under reduced pressure, a glasslike mass is obtained, from which the desired tris-ester can be isolated in purer from after recrystallization from isopropanol. Its constitution is confirmed by $^1$H NMR analysis (cf. Table I).

Yield: 145.8 g (=71% of theory)
Melting point: 53° to 56° C.
Purity: ≧95% (according to NMR)

EXAMPLE 21

Production of tris-[3-(3,5-di-tert-butyl-4-hydroxyphenyl) propionic acid] ester of 1,3,5-tris-[1-methyl--1-(4'-(2''-hydroxyethoxy)-phenyl)-ethyl] benzene (1,3,5-tris-[4-(2'-hydroxyethoxy) phenyl-isopropylidene] benzene).

According to the procedure described in example 1, 0.15 mol (91.92 g) of 1,3,5-tris-[1-methyl-1-(4'-(2''-hydroxyethoxy)-phenyl] benzene, which was produced according to example 11, is transesterified, in the presence of 0.01 mol (3.5 g) of titanium tetrabutylate, with 0.48 mol (131.59 g) of 3-(3,5-di-tert-butyl-4-hydroxyphenyl) propionic acid methyl ester within 10 hours.

After working up and removal of unreacted or excess initial materials under reduced pressure, a viscous oil remains, which solidifies when it cools. The glasslike, pulverizable mass consists of the tris-ester according to the invention. Its constitution is confirmed by the $^1$H NMR spectrum. (Cf. Table I for further details.)

Yield: 193 g (=92.3% of theory)
Melting point: 58° to 61° C.
Purity: about 95% (according to $^1$H NMR)

EXAMPLES 22 to 32

Stabilization of polypropylene with stabilizers according to the invention (examples 22 to 27) and with stabilizers according to the prior art (comparison examples 28 to 32)

2 kg of polypropylene powder is mixed with the amounts indicated in Table III of stabilizer (esters according to the invention according to examples 22 to 27 or stabilizers according to the prior art in examples 28 to 32), of calcium stearate as processing auxiliary agent as well as of bis-(octadecyl) thiodipropionic acid ester and optionally of tris-(2,4-di-tert-butylphenyl) phosphite and is mixed in a mixing unit (e.g., fluid mixer of Papenmeier company) at room temperature for a short time (about 1 minute). The powder mixtures obtained are extruded at 100 rpm and a maximum of 230° C. with an extruder (Troester company, d=30 mm, l=20 d) and then granulated. The granulate is moled at 210° C. to 1-mm thick plates and from them, polyolefin strips with measurements of 1×10×100 mm are punched. The latter are stored free-standing in a suitable device at 145° C. in a forced-air drying cabinet in the presence of air until, as a sign of the starting embrittlement a crumbling of the test pieces or formation of cracks on them, can be observed. Table III contains the results.

From the resistance of the stabilized polypropylene test pieces determined at 145° C. it is seen that the action of the esters to be worked in according to the invention reaches or exceeds generally the level of the test pieces in which stabilizers according to the prior art were added.

EXAMPLES 33 to 39

Examination of stabilized polypropylene test pieces for color changes

Some of the stabilizers according to examples 22 to 27 according to the invention and optionally polypropylene granulates provided with other additives are molded at 210° C. into plates (measurements of 4×10×100 mm). After a 4-week storage at 100° C. these are assessed in regard to possible color changes in comparison with samples not thermally stressed and in comparison with test pieces similarly aged at 100° C. with stabilizers not according to the invention (examples 37 to 39). The following table contains visually determined color impressions, which are related to similarly aged comparison sample pieces with tetra- or di-[3-(3,5-di-tert-butyl-4-hydroxyphenyl) propionic acid] esters of pentaerythritol (example 38, produced according to example 31), of 2,2-bis[4'-(2''-hydroxyethoxy) phenyl] propane (example 37, produced according to example 28) or thiodiethanol (example 39, produced according to example 32).

It is seen from the test results reproduced in Tables III and IV that with the stabilization according to the invention advantages are to be achieved in comparison with the prior art, since with similar long-time stabilization to some extent lesser color changes are to be observed than with stabilizers according to the prior art.

EXAMPLES 40 to 45 (EXAMPLES 44 AND 45 NOT ACCORDING TO THE INVENTION)

Stabilized polypropylene powder, produced according to examples, 22, 23, 25 and 27 as well as 28 and 31, is extruded on an extruder (Brabender company; d=19 mm, l=20 d) several times (at 30 rpm and at a temperature of 270° C. at most). The suitability of the stabilizers used as processing stabilizers is examined by means of the $I_5$ values determined at 190° C., from which the extent of a starting molecular weight degradation can be seen. Table V contains the measured values, which reproduce the effects of multiple extrusion in the presence of the stabilizers according to the invention (according to examples 12, 13, 17 and 19) or of two stabilizers according to the prior art (bis- or tetra-[3-(3',5'-di-tert-butyl-4'-hydroxyphenyl) propionic acid] ester of 2,2-bis[4'-(2''-hydroxyethoxy) phenyl] propane (example 44) and pentaerythritol (example 45).

It is seen that with the stabilizers according to the invention the prior art in most cases is reached, especially, if small amounts of synergists are added.

EXAMPLES 46 TO 50 (EXAMPLES 48 TO 50 NOT ACCORDING TO THE INVENTION)

In a way similar to that in examples 24, 26, 29 and 31 in each case with 0.1% by weight of stabilizer and 0.1% by weight of calcium stearate as well as optionally in addition with 0.1% by weight of bis-(octadecyl)-thiodipropionic acid ester (abbrv. S) and with 0.1% by weight of tris-2,4-di-tert-butylphenyl) phosphite (abbrv. P), stabilized polypropylene powder is extruded several times at a maximum of 270° C. on an Extrusimeter (Goepfert company; d=20 mm, l=20 d; 30 rpm; ratio of thread depth 1:3). The $I_5$ values measured on the granulates obtained at 190° C. are summarized in Table VI.

In it also seen in this series of tests that the stabilizers according to the invention (according to examples 15 and 18) especially in the presence of synergists produce as good a processing stability of the polypropylene as the stabilizers (used in examples 48 and 49) according to the prior art (example 48: octadecyl ester of 3-(3,5-di-tert-butyl-4-hydroxyphenyl) propionic acid; example 49; tetraester of the same acid of petraerythritol). As control test piece extruded unstabilized polypropylene (cf. example 50) shows a substantially greater molecular weight degradation than all stabilized test pieces.

EXAMPLES 51 TO 54 (EXAMPLES 53 AND 54 NOT ACCORDING TO THE INVENTION)

If polyethylene test pieces produced and stabilized analogously to examples 24, 26, 29 and 31 are subjected, analogously to examples 33 and 39, to a 28-day aging at 100° C. and a subsequent visual assessment of possible color changes, then the sample according to example 24 stabilized according to the invention is to be assessed as good as test pieces 29 and 31 according to the prior art, while test piece 26, which contains a sulfur-containing stabilizer, does not at all reach the level of the other test pieces (for evaluations, cf.table VI).

TABLE I

1H NMR spectra of 3-(3,5-di-tert-butyl-4-hydroxyphenyl) propionic acid esters of oxethylates of various bis- or tris- (hydroxyphenyl) alkanes, oxides, sulfides, sulfones and aryls Resonance lines of $^1$H NMR spectra* (in ppm) (Classification according to structure formula** of the esters according to the invention)

| Ester ac. ex. No. | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 7,04 | 5,11 | 4,46 | 4,17 | 2,91 | 2,66 | 1,44 | 7,13 | 6,86 | | | | 1,65 |
|  | (4) | (2) | (4) | (4) | (4) | (4) | (36) | (4) | (4) | | | | (6) |
| 12 | 6,99 | 5,07 | 4,41 | 4,12 | 2,87 | 2,63 | 1,4–1,5 | 7,16 | 6,80 | | | | 2,20 1,4–1,5 |
|  | (4) | (2) | (4) | (4) | (4) | (4) | (36) | (4) | (4) | | | | (4) (6) |
| 13 | 7,00 | 5,07 | 4,42 | 4,13 | 2,86 | 2,63 | 1,42 | 7,15 | 6,80 | | | | 7,08 + 1,62 |
|  | (4) | (2) | (4) | (4) | (4) | (4) | (36) | (4) | (4) | | | | (4) (12) |
| 14 | 7,00 | 5,08 | 4,43 | 4,14 | 2,88 | 2,65 | 1,43 | 7,00 | 6,80 | | | | 7,23 + 7,07 + 2,13 |
|  | (4) | (2) | (4) | (4) | (4) | (4) | (36) | (4) | (4) | | | | (3) (2) (3) |
| 15 | 6,98 | 5,06 | 4,37 | 3,87 | 2,90 | 2,67 | 1,2–1,9 | 6,90 | 6,69 | 2,90 | 2,22 | 1,2–1,9 | 4,00 |
|  | (4) | (2) | (4) | (4) | (4) | (4) | (36) | (2) | (2) | (2) | (6) | (20) | (2) |
| 16 | 7,00 | 5,07 | 4,42 | 4,13 | 2,88 | 2,64 | 1,42 | 7,06 | 6,78 | | | | 2,00 + 0,8–1,5 |
|  | (4) | (2) | (4) | (4) | (4) | (4) | (36) | (4) | (4) | | | | (4) (18) |
| 17 | 7,00 | 5,09 | 4,41 | 4,10 | 2,88 | 2,65 | 1,41 | 6,90 | 6,84 | | | | |
|  | (4) | (2) | (4) | (4) | (4) | (4) | (36) | (4) | (4) | | | | |
| 18 | 6,99 | 5,07 | 4,40 | 4,11 | 2,87 | 2,64 | 1,42 | 7,24 | 6,82 | | | | |
|  | (4) | (2) | (4) | (4) | (4) | (4) | (36) | (4) | (4) | | | | |
| 19 | 6,96 | 5,07 | 4,41 | 4,17 | 2,87 | 2,63 | 1,41 | 7,83 | 6,93 | | | | |
|  | (4) | (2) | (4) | (4) | (4) | (4) | (36) | (4) | (4) | | | | |
| 20 | 7,00 | 5,07 | 4,42 | 4,13 | 2,88 | 2,65 | 1,42 | 7,00 | 6,82 | | | | 5,39 |
|  | (6) | (3) | (6) | (6) | (6) | (6) | (54) | (6) | (6) | | | | (1) |
| 21 | 7,01 | 5,09 | 4,43 | 4,14 | 2,90 | 2,66 | 1,43 | 7,04 | 6,76 | | | | 6,90 + 1,56 |
|  | (6) | (3) | (6) | (6) | (6) | (6) | (54) | (6) | (6) | | | | (3) (18) |
| 61 | 6,87 | 4,9 | 4,4 | 4,1 | 2,8 | 2,6 | 1,4 | 6,82 | 6,75 | 6,54 | 2,1 | | 0,7–2,0 |
|  | (4) | (2) | (4) | (4) | (4) | (4) | (36) | (2) | (2) | (2) | (6) | | (22) |
| 62 | 7,00 | 5,10 | 4,50 | 4,20 | 2,90 | 2,60 | 1,40 | 7,2 | 7,0 | 6,70 | 1,30 | | 0,8–2,1 |
|  | (4) | (2) | (4) | (4) | (4) | (4) | (36) | (2) | (2) | (2) | (18) | | (22) |
| 63 | 6,98 | 5,06 | 4,48 | 4,15 | 2,88 | 2,62 | 1,42 | 7,20 | 6,98 | 6,72 | 1,35 | | 2,23 + 1,1–1,8 |
|  | (4) | (2) | (4) | (4) | (4) | (4) | (36) | (2) | (2) | (2) | (18) | | (4) (6) |
| 64 | 6,98 | 5,08 | 4,49 | 4,17 | 2,88 | 2,62 | 1,42 | 7,16 | 7,02 | 6,71 | 1,33 | | 1,65 |
|  | (4) | (2) | (4) | (4) | (4) | (4) | (36) | (2) | (2) | (2) | (18) | | (6) |
| 65 | 6,88 | 4,9 | 4,3 | 4,0 | 2,8 | 2,6 | 1,4 | 7,0 | 6,66 | | | | 6,8–7,0 + 1,6 |
|  | (4) | (2) | (4) | (4) | (4) | (4) | (36) | (4) | (4) | | | | (4) (12) |
| 66 | 7,00 | 5,08 | 4,41 | 4,12 | 2,88 | 2,65 | 1,42 | 6,98 | | 6,79 | | | 2,09 |

TABLE I-continued $^1$H NMR spectra of 3-(3,5-di-tert-butyl-4-hydroxyphenyl) propionic acid esters of oxethylates of various bis- or tris-(hydroxyphenyl) alkanes, oxides, sulfides, sulfones and aryls Resonance lines of $^1$H NMR spectra* (in ppm)
(Classification according to structure formula** of the esters according to the invention)

| Ester ac. ex. No. | 1 | 2 | 3 | 4 | 5 | 6 | 7 | 8 | 9 | 10 | 11 | 12 | 13 |
|---|---|---|---|---|---|---|---|---|---|---|---|---|---|
| | (6) | (3) | (6) | (6) | (6) | (6) | (54) | (6) | | (6) | | | (3) |

Explanations: *measured in CDCl$_3$ against TMS (internally), concentration about 20 volume percent; the signal positions in ppm (with TMS = 0 ppm) and the number of the respective H atoms (in each case in parentheses) are indicated.
**Classification signals

[Chemical structures:]

7 (CH$_3$)$_3$C
2 HO— (phenyl ring with positions 1, 5, 6, 3, 4) —CH$_2$CH$_2$COCH$_2$CH$_2$—Y
7 (CH$_3$)$_3$C wherein y represents =, —O—(phenyl)—A—[(phenyl)—O—]$_m$
wherein m is 1 or 2

[Additional structural formulas with R$_1$, R$_2$, A positions 8, 9, 10, 11, 12]

11 R$_1$ = CH$_3$; C(CH$_3$)$_3$ 10 12 R$_2$ = —(cyclohexyl with positions 10, 12, 12, 12)

13 A = CH$_3$—C(CH$_3$)—CH$_3$; —C(CH$_3$)(CH$_3$)—(phenyl)—C(CH$_3$)(CH$_3$)—; HC<; CH$_3$—C(H)—(phenyl);

(additional structures with CH$_3$ groups, (CH$_2$)$_n$ wherein n is 5 or 11, etc.)

TABLE II

Synthesized tris- or bis-[4- or 2-(2'-hydroxyethoxy) phenyl] compounds (not according to the invention)

| Initial product ac. ex. No. | Formula of initial product | Bis- or tris- (monooxethylate) Yield (% of th.) | Melting point °C. | Solvent for recrystallization |
|---|---|---|---|---|
| 1 | HO—(phenyl)—C(CH$_3$)(CH$_3$)—(phenyl)—OH | 65 | 108–109,5 | Diglyme |

TABLE II-continued
Synthesized tris- or bis-[4- or 2-(2'-hydroxyethoxy) phenyl] compounds (not according to the invention)
| Initial product ac. ex. No. | Formula of initial product | Bis- or tris- (monooxethylate) Yield (% of th.) | Melting point °C. | Solvent for recrystallization |
|---|---|---|---|---|
| 2 | 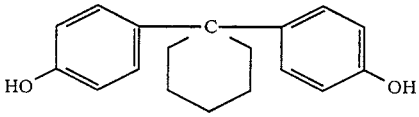 | 65 | 99,5–101 | Ethanol |
| 3 | 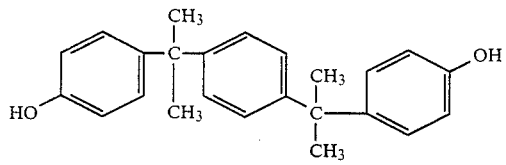 | 44 | 104–105 | Methanol |
| 4 | 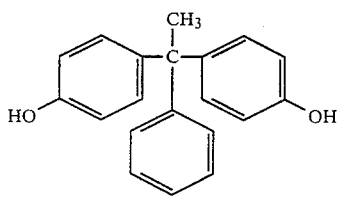 | 80 | 58–60 | Ethanol |
| 5 | 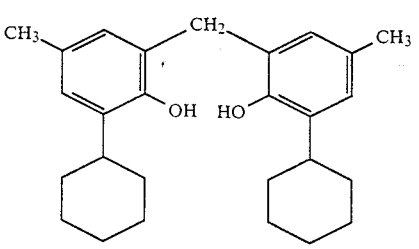 | 62 | 155–156 | Ethanol |
| 6 | 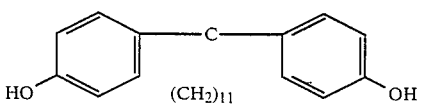 | 65 | 124,5–126 | Methanol |
| 7 | 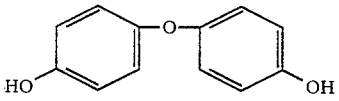 | 69 | 134–136 | Methanol |
| 8 | 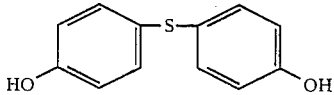 | 65 | 103–104 | Ethanol |
| 9 | 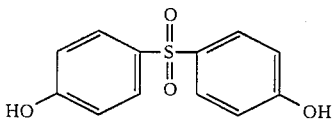 | 55 | 178–179 | Tetrahydrofuran |
| 10 | 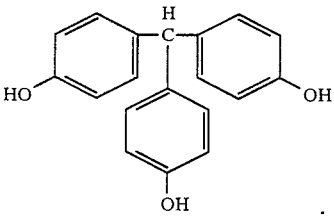 | 51 | 109–111 | Methanol |

TABLE II-continued

Synthesized tris- or bis-[4- or 2-(2'-hydroxyethoxy) phenyl] compounds (not according to the invention)

| Initial product ac. ex. No. | Formula of initial product | Bis- or tris- (monooxethylate) Yield (% of th.) | Melting point °C. | Solvent for recrystallization |
|---|---|---|---|---|
| 11 | 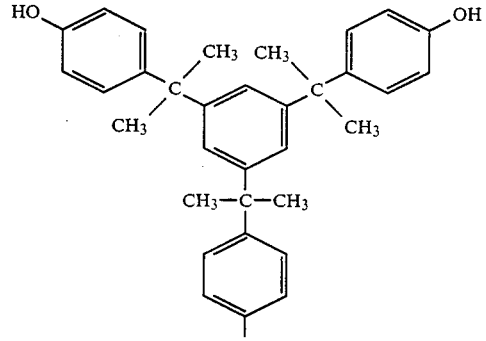 | 79 | 79–82 | petroleum ether methanol |

TABLE III

Aging tests at 145° C. with addition of stabilizers according to the invention to polypropylene

| Ex. No. | Stabilizer ac. to ex. No. | Formula of stabilizers | Aging at 145° C. (days) A* | B* | C* |
|---|---|---|---|---|---|
| 22 | 12 | | 36 | 73 | 78 |
| 23 | 13 | | 44 | 79 | 82 |
| 24 | 15 | | 35 | 72 | 78 |
| 25 | 17 | | 39 | 70 | 77 |
| 26 | 18 | | 36 | 69 | 76 |
| 27 | 19 | | 30 | 31 | 28 |

TABLE III-continued

Aging tests at 145° C. with addition of stabilizers according to the invention to polypropylene

| Ex. No. | Stabilizer ac. to ex. No. | Formula of stabilizers | Aging at 145° C. (days) A* | B* | C* |
|---|---|---|---|---|---|
| 28 | 1 Comparison tests with stabilizers according to the prior art | [structure with (CH₃)₃C, OH, C(CH₃)₃, CH₂CH₂C(=O)—OCH₂CH₂O—C₆H₄—C(CH₃)₂—C₆H₄—OCH₂—OCH₂—X]  Abk. = X | 35 | 72 | 76 |
| 29 | | $CH_3(CH_2)_{17}-O-X$ | 5 | 11 | 12 |
| 30 | Comparison tests with stabilizers according to the prior art | [2,6-di-tert-butyl-4-methylphenol structure] | 2 | 7 | 8 |
| 31 | | $C-(CH_2O-X)_4$ | 49 | 76 | 81 |
| 32 | | $X-OCH_2CH_2SCH_2CH_2O-X$ | 13 | 18 | 29 |

Abbreviations:
A = 0.1% by weight of stabilizer additive
B = as A and additionally 0.1% by weight of bis-(octadecyl)thiodipropionic acid ester
C = as B and additionally 0.1% by weight of tris-(2,4-di-tert-butylphenyl) phosphite
X = 3-(3,5-di-tert-butyl-4-hydroxyphenyl) propionic acid radical

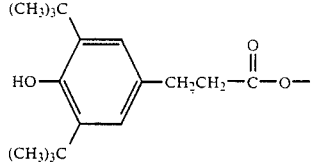

TABLE IV

Visually determined color impressions after 4-week aging of polypropylene test pieces at 100° C.

| Ex. No. | Stabilizer (stabilized polymer ac. to ex.) | Color impression** (related to ex. No. 38) Sample produced by addition of A* | B* | C* |
|---|---|---|---|---|
| 33 | 12 (22) | 0 | 0 | — |
| 34 | 13 (23) | + | 0 | 0 |
| 35 | 17 (25) | 0 | — | (−) |
| 36 | 19 (27) | — | — | — |
| 37 | 1 (28) | (−) | 0 | 0 |
| 38 | Prior (31) | 0 | 0 | 0 |
| 39 | art (32) | — | — | — |

*A = 0.1% by of antioxidizing additive
*B = as A and additionally 0.1% by weight of bis-(octadecyl)thiodipropionic acid ester
*C = as B and additionally 0.1% by weight of tris-(2,4-di-tert-butylphenyl) phosphite
**Data in each case in relation to the comparison tests according to example 38 with same additive addition
0: as good as according to example 38
(+): somewhat better than example 38
+: better than according to example 38
+ +: substantially better than according to example 38
(−): somewhat poorer than according to example 38
−: poorer than according to example 38
—: substantially poorer than according to example 38 comparison test = prior art

TABLE V

Multiple extrusion of stabilized polypropylene test pieces (Extruder Brabender company)

| Ex. No. | Polypropylene ac. ex. No. Nr. | Additions of synergists | | MFI values (g/10 min) after multiple extrusion 0× | 1× | 2× | 3× | 4× |
|---|---|---|---|---|---|---|---|---|
| 40 | 22 | — | (A)* | 4,1 | 19 | 33 | 48 | 65 |
| | | S* | (B)* | 4,2 | 12 | 20 | 31 | 45 |
| | | S + P* | (C)* | 3,6 | 6,7 | 8,8 | 12 | 16 |

TABLE V-continued

Multiple extrusion of stabilized polypropylene test pieces
(Extruder Brabender company)

| Ex. No. | Polypropylene ac. ex. No. Nr. | Additions of synergists | | MFI values (g/10 min) after multiple extrusion | | | | |
|---|---|---|---|---|---|---|---|---|
| | | | | 0× | 1× | 2× | 3× | 4× |
| 41 | 23 | — | (A) | 4,1 | 14 | 23 | 31 | 40 |
| | | S | (B) | 4,1 | 12 | 20 | 29 | 42 |
| | | S + P | (C) | 2,9 | 6,7 | 8,9 | 12 | 17 |
| 42 | 25 | — | (A) | 3,9 | 13 | 21 | 28 | 38 |
| | | S | (B) | 4,7 | 12 | 20 | 29 | 44 |
| | | S + P | (C) | 3,8 | 6,7 | 9,3 | 13 | 16 |
| 43 | 27 | — | (A) | 4,2 | 13 | 20 | 27 | 42 |
| | | S | (B) | 3,9 | 10 | 16 | 24 | 38 |
| | | S + P | (C) | 3,3 | 6,7 | 9,6 | 13 | 17 |
| 44 | 28 | — | (A) | 4,2 | 13 | 20 | 28 | 33 |
| | Prior art | S | (B) | 3,8 | 14 | 20 | 30 | 43 |
| | | S + P | (C) | 3,7 | 6 | 9 | 12 | 16 |
| 45 | 31 | — | (A) | 4,0 | 12 | 16 | 19 | 24 |
| | Prior art | S | (B) | 4,1 | 10 | 17 | 28 | 38 |
| | | S + P | (C) | 3,6 | 6,4 | 9,3 | 12 | 16 |

Explanations to Table V
*Abbreviations:
A = 0.1% by weight of stabilizer
B = 0.1% by weight of stabilizer and additionally 0.1% by weight of bis-(octadecyl) thiodipropionic acid ester (abbr. S)
C = as B and additionally 0.1% by weight of tris-(2,4-di-tert-butylphenyl) phosphite (abbr. P)

TABLE VI

Multiple extrustion of stabilized polypropylene test pieces
(Extruder Goepfert company) and discoloration of analogously
stabilized polyethylene test pieces after aging at 100° C. (28 days)

| Ex. No. | Polypropylene (polyethylene) ac. ex. No. | Additions of synergists | | MFI Value (g/10 min) after multiple extrusion | | | | | | Assessment of discoloration** after 28 days |
|---|---|---|---|---|---|---|---|---|---|---|
| | | | | 0× | 1× | 2× | 3× | 4× | 5× | |
| 46 (51) | 24 | — | (A)* | 3,3 | 7,7 | 11,7 | 17,3 | 22,1 | 28,3 | 0 |
| | | S + P* | (C)* | 3,0 | 4,0 | 5,0 | 5,7 | 6,8 | 8,0 | |
| 47 (52) Prior art | 26 | — | (A) | 3,3 | 8,4 | 13,8 | 19,8 | 26,7 | 33,4 | — |
| | | S + P | (C) | 3,1 | 4,1 | 5,2 | 6,0 | 6,9 | 8,2 | |
| 48 (53) | 29 | — | (A) | 3,7 | 11,2 | 18,9 | 27,4 | 37,8 | 52,4 | 0 |
| | | S + P | (C) | 3,0 | 3,9 | 5,3 | 6,3 | 7,7 | 9,3 | |
| 49 (54) | 31 | — | (A) | 3,1 | 6,7 | 9,5 | 12,7 | 17,6 | 20,4 | 0 |
| | | S + P | (C) | 3,2 | 3,9 | 4,4 | 5,3 | 6,2 | 6,9 | |
| 50 | unstabilized control test piece | — | | 5,2 | 26,2 | 56 | 140 | | | |

Explanations to Table VI
*Abbreviations
A = 0.1% by weight of stabilizer
B = as A and additionally 0.1% by weight of tris-(2,4-di-tert-butylphenyl) phosphite (abbr. P) and 0.1% by weight of bis-(octadecyl) thiodipropionic acid ester (abbr. S)
**Assessment of discoloration of aged stabilized polyethylene test pieces, cf. Table IV in relation to gradations

EXAMPLES 55 TO 60 (NOT ACCORDING TO THE INVENTION)

Production of various bis- or tris-(4-(2'-hydroxyethoxy) phenyl)-compounds

Analogously to examples 2 to 11, 1,1-bis-(4-hydroxy-3-methylphenyl)cyclododecane (example 55), 1,1-bis-(4-hydroxy-3-tert-butylphenyl)cyclododecane (example 56), 1,1-bis-(4-hydroxy-3-tert-phenyl) cyclohexane (example 57), 2,2-bis-(4-hydroxy-3-tert-butyphenyl) propane (example 58), alpha,alpha'-bis-(4-hydroxyphenyl)-m-diisopropyl benzene (example 59) and 1,1,1-tris-(4-hydroxyphenyl)-ethane (example 60) by oxethylation are converted into the corresponding bis- or tris-(monooxethylates) (i.e. bis- or tris-(4-(2'-hydroxyethoxy)phenyl) compounds). The constitution of these bifunctional or trifunctional alcohols is verified by the position and intensity of the resonance lines of the $^1$H NMR spectra. The compounds exhibit, optionally after recrystallization from ethanol, the following melting points:

Example 55: 168 to 170° C.   Example 58: 122 to 124° C.
Example 56: 189 to 190° C.   Example 59: 76 to 77.5° C.
Example 57: 63 to 67° C.     Example 60: 106 to 108° C.

EXAMPLES 61 TO 66

Production of bis- or tris-[3-(3,5-di-tert-butyl-4-hydroxyphenyl) propionic acid] esters of various bifunctional and trifunctional alcohols According to the procedure used in examples 1 as well as 12 to 21, the polyhydric alcohols, produced according to examples 55 to 60, in the presence of titanium tetrabutylate at temperatures of about 120° C. are transesterified with excess 3-(3,5-di-tert-butyl-4-hydroxyphenyl) propionic acid methyl ester. The reaction times are 5 to 10 hours. The working up and removal of unreacted or excessive initial materials, take place as in the earlier examples. As with them, the constitution of the now obtained, previously undescribed esters after recrystallization from suitable solvents are confirmed by the position and intensity of the signals of the $^1$H NMR spectra.

EXAMPLE 61

Bis-ester of 1,1-bis(4-(2'-hydroxyethoxy)3-methylphenyl) cyclododecane

Yield: 71% of theory
Melting point: 99° to 102° C. (from ethanol)

EXAMPLE 62

Bis-ester of 1,1-bis-(4-(2'-hydroxyethoxy) 3-tert-butylphenyl) cyclododecane

Yield: 54.1% of theory
Melting point: 86° to 90° C. (from petroleum ether)
Purity: ≧95% (according to $^1$H NMR)

EXAMPLE 63

Bis-ester of 1,1-bis-(4-(2'-hydroxyethoxy) 3-tert-butylphenyl) cyclohexane

Yield: 85% of theory
Melting point: 42° to 50° C.
Purity: ≧90% (according to $^1$NMR)

EXAMPLE 64

Bis-ester of 2,2-bis-(4-(2'-hydroxyethoxy) 3-tert-butylphenyl) propane

Yield: 48% of theory
Melting point: 113° to 115° C. (from ethanol)
Purity: ≧95% (according to $^1$H NMR)

EXAMPLE 65

Bis-ester of alpha,alpha'-(4-(2'-hydroxyethoxy) phenyl]m-diisopropyl benzene

Yield: 82.8% of theory
Melting point: 53° to 57° C.
Purity: ≧95% (according to $^1$H NMR)

EXAMPLE 66

Tris-ester of 1,1,1-tris-(4-(2'-hydroxyethoxy) phenyl) ethane

Yield: 76% of theory
Melting point: 58° to 65° C.
Purity: about 90% (according to $^1$H NMR)

EXAMPLES 67 TO 71

Stabilization of polypropylene with stabilizers according to the invention (examples 67 to 70) and with a stabilizer according to the prior art (comparison test example 71)

In the same way as in examples 22 to 32, polypropylene powder is mixed with 0.1% by weight of the various stabilizers according to the invention, which were produced according to examples 14, 16, 20 and 21, or with a stabilizer according to the prior art (tetra-[3-(3,5-di-tert-butyl-4-hydroxyphenyl) propionic acid ester] of pentaerythritol) and with 0.1% by weight of calcium stearate as processing agent as well as additionally with 0.1% by weight of bis-(octadecyl)-thiodipropionic acid ester (abbr. S) and with 0.1% by weight of tris-(2,4-di-tert-butylphenyl)phosphite (abbr. P). The pressed plates obtained from the powder mixtures are used for the production of polyolefin strips, which are subjected to aging at 145° C. in a forced-air drying cabinet. Table VII contains the results.

It can be seen from the stability of the stabilized polypropylene test pieces determined at 145° C. that the action of the esters worked in according to the invention reaches or exceeds the level of the test pieces in which the stabilizer according to the prior art was used.

EXAMPLES 72 TO 76

Examination for color changes in stabilized polyethylene test pieces 0.1% by weight of the stabilizers according to the invention, which were produced according to examples 14, 16, 20 and 21 (examples 72 to 75) or 0.1% by weight of the stabilizer also used in comparison example 71 (according to the prior art) as well as 0.1% by weight of calcium stearate are worked into polyethylene powder and the granulates produced therefrom are pressed into plates at 210° C. with measurement of 4×10×100 mm, thus the color changes visually determinable from these after 4-week aging at 100° C. can be used for an assessment.

The test results show that in no case does stronger discoloration occur on the polyethylene plates (examples 72 to 75) stabilized according to the invention than on the material stabilized according to the prior art (example 76 not according to the invention), and the degree of the discoloration of all test pieces is small.

EXAMPLES 77 TO 81 (EXAMPLE 81 NOT ACCORDING TO THE INVENTION)

Examination of the processing stability of stabilized polypropylene

Stabilized polypropylene powder produced according to examples 67 to 71 is extruded several times analogously to examples 46 to 50 at 270° C. at most on an Extrusimeter (Goepfert company; d=20 mm, l=30 d; 30 rpm; ratio of thread depth 1:3). The $I_5$ values (MFI) measured from the obtained granulates at 190° C. can be gathered from Table VIII.

It is seen that with the stabilizers according to the invention, which were used in examples 77 to 80 (and produced according to examples 14, 16, 20 and 21), especially in the presence of synergists, polypropylene can be stabilized just as well as according to the prior art (represented by example 81).

TABLE VII

Aging tests at 145° C. with addition of stabilizers according to the invention to polypropylene

| Ex. No. | Stabilizer ac. to ex. No. | Formula of stabilizers | Aging at 145° C. (days) A* | B* | C* |
|---|---|---|---|---|---|
| 67 | 14 | X—OCH₂CH₂O—⟨⟩—C(CH₃)(C₆H₅)—⟨⟩—OCH₂CH₂O—X* | 57 | 77 | 103 |
| 68 | 16 | X—OCH₂CH₂O—⟨⟩—C(CH₂)₁₁—⟨⟩—OCH₂CH₂O—X | 54 | 90 | 109 |
| 69 | 20 | HC—(⟨⟩—OCH₂CH₂O—X)₃ | 51 | 85 | 84 |
| 70 | 21 | (structure with three p-OCH₂CH₂O—X phenyl groups on central benzene via C(CH₃)₂) | 47 | 94 | 97 |
| 71 | Comparison test according to the prior art | C(CH₂O—X)₄ | 53 | 87 | 98 |

Abbreviations:
(as in Table III)
A = 0.1% by weight of stabilizer additive
B = as A and additionally 0.1% by weight of bis-(octadecyl)thiodipropionic acid ester
C = as B and additionally 0.1% by weight of tris-(2,4-di-tert-butylphenyl) phosphite
X = 3-(3,5-di-tert-butyl-4-hydroxyphenyl) propionic acid radical

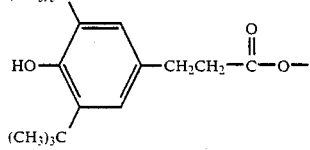

TABLE VIII

Multiple extrusion of stabilized polypropylene test pieces (Goepfert Extrusimeter)

| Ex. No. | Polypropylene ac. ex. No. | MFI values (g/10 min) after multiple extrusion | | | | | | | | | | | |
| | | without addition of synergists* | | | | | | with addition of synergists** | | | | | |
| | | 0× | 1× | 2× | 3× | 4× | 5× | 0× | 1× | 2× | 3× | 4× | 5× |
|---|---|---|---|---|---|---|---|---|---|---|---|---|---|
| 77 | 67 | 3,2 | 8,5 | 13,7 | 19,9 | 25,0 | 33,4 | 3,3 | 4,3 | 4,9 | .5,8 | 6,8 | 8,2 |
| 78 | 68 | 3,3 | 7,9 | 12,8 | 19,0 | 24,4 | 31,9 | 2,9 | 4,1 | 5,0 | 5,7 | 7,0 | 8,6 |
| 79 | 69 | 3,0 | 6,5 | 10,4 | 13,9 | 18,6 | 25,1 | 3,0 | 4,1 | 4,9 | 5,6 | 7,1 | 7,5 |
| 80 | 70 | 4,5 | 9,2 | 14,1 | 20,2 | 24,9 | 31,9 | 2,9 | 4,1 | 5,0 | 5,7 | 7,0 | 8,6 |
| 81 | 71 | 2,8 | 5,8 | 8,9 | 12,6 | 17,6 | 20,6 | 3,0 | 3,8 | 4,4 | 5,3 | 6,2 | 6,9 |

TABLE VIII-continued

| | | Multiple extrusion of stabilized polypropylene test pieces (Goepfert Extrusimeter) | | | | | | | | | | | |
|---|---|---|---|---|---|---|---|---|---|---|---|---|---|
| Ex. No. | Polypropylene ac. ex. No. | MFI values (g/10 min) after multiple extrusion | | | | | | | | | | | |
| | | without addition of synergists* | | | | | | with addition of synergists** | | | | | |
| | | 0× | 1× | 2× | 3× | 4× | 5× | 0× | 1× | 2× | 3× | 4× | 5× |
| | Prior art | | | | | | | | | | | | |

Explanations:
*Test pieces with 0.1% by weight of stabilizer and 0.1% by weight of calcium stearate
**Test pieces additionally contain 0.1% of bis-(octadecyl)thiodipropionic acid ester and 0.1% by weight of tris-2,4-di-tert-butylphenyl) phosphite The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An ester of a 3-tert-butyl or a 3-tert-butyl-5-alkyl-4-hydroxyphenyl-(alkane) carboxylic acid of formula I

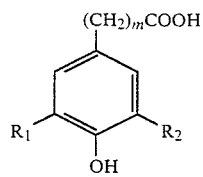

wherein
$R_1$ represents $-C(CH_3)_3$;
$R_2$ represents H, $C_1$ to $C_4$ alkyl;
m represents 0 to 4;
with an oxethylate of a bis-(4 or 2-hydroxyphenyl) alkane, oxide, sulfide or sulfone of formula II, an oxethylate of tris-(4-hydroxyphenyl) alkane of formula IIIa, or with an oxethylate of a 1,3,5-tris-(4-hydroxyphenyl isopropylidene) aryl of formula IIIb

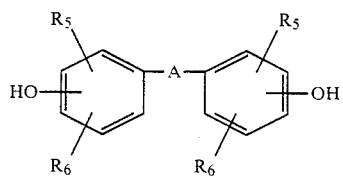

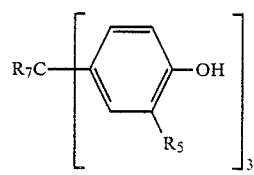

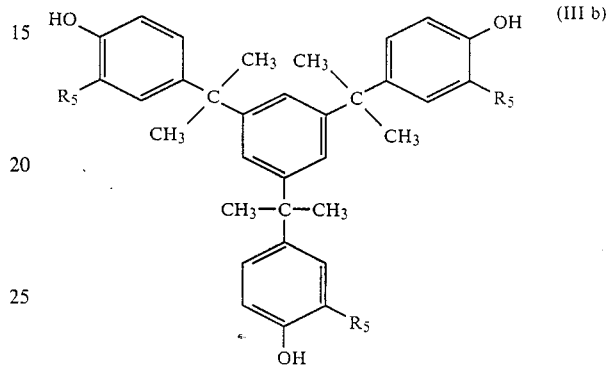

wherein
A represents $-CR_3R_4-$, $C_2$ to $C_{12}$ alkanediyl, $-O-$, $-OCH_2CH_2O-$, $-S-$, $-SCH_2CH_2S-$, $-SO_2-$, $-SO_2CH_2CH_2SO_2-$, bis-isopropyliden arylradicals, or (1,4- or 1,3-bis-methyl ethyl) benzene radicals $R_3$, $R_4$ represent H, $C_1$ to $C_8$ alkyl, aryl, 4-[(4-hydroxyphenyl)-isopropylidene] phenyl, or $C_5$ to $C_{12}$ cycloalkyl with the provision that $R_3$ and $R_4$ are other than $CH_3$ if $R_5$ and $R_6$ represent H; or $-CR_3R_4-$ represents an optionally alkyl-substituted cycloalkylidene ring of not more than 12 carbon atoms;

$R_5$, $R_6$ represent H, $C_1$ to $C_4$ alkyl, $C_5$ to $C_{12}$ cycloalkyl, or $C_1$ to $C_4$ alkoxyl with the provision that when $R_5$ and $R_6$ are other than H in formula II, both substituents cannot be in the o or o′ position of the phenolic hydroxyl;

$R_7$ represents H or $C_1$ to $C_8$ alkyl; and the oxethylate contains a maximum of 3 alkylene oxide units.

2. An ester according to claim 1, wherein said ester is of 3-(3,5-di-tert-butyl-4-hydroxyphenyl) propionic acid of formula Ia

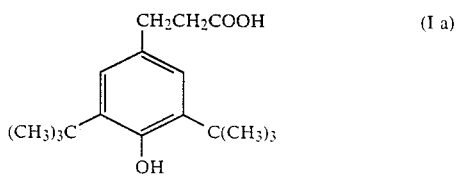

3. An ester according to claim 1, wherein a 2-hydroxyethoxy group is substituted for each hydroxyl group in the compounds of formulae II, IIIa, and IIIb.

4. An ester according to claim 1, with a bis-(monooxethylate) of alpha,alpha′-bis-(4-hydroxyphenyl)p- or -m-diisopropyl benzene, of 1,1-bis-(4-hydroxyphenyl) cyclohexane, of 1,1-bis-(4-hydroxy-3-tert-butylphenyl) cyclohexane, of 1,1-bis-(4-hydroxyphenyl) cyclododecane, of 1,1-bis-(4-hydroxy-3-methylphenyl) cyclododecane, of 1,1-bis-(4-hydroxy-3-tert-butylphenyl) cyclododecane, of 1,1-bis-(4-hydroxyphenyl)-1-phenyl ethane, of 2,2-bis-(4-hydroxy-3-tert-butylphenyl) propane, of bis-(2-hydroxy-3-cyclohexyl-5-methylphenyl) methane, of bis-(4-hydroxyphenyl) ether, of bis-(4-hydroxyphenyl) sulfide or of bis-(4-hydroxyphenyl) sulfone; or with a tris-(monooxethylate) of tris-(4-hydroxyphenyl) methane, of 1,1,1-tris-(4-hydroxyphenyl) ethane and of 1,3,5-tris-(4-hydroxyphenyl-isopropylidene) benzene.

5. An ester according to claim 1, wherein Formula II is a bis-(4-hydroxyphenyl) compound, $R_3$ and $R_4$ represent $C_1$–$C_8$ alkyl or $R_3$ and $R_4$ together with C represent an optionally alkyl substituted cycloalkylidene of 5–12 carbon atoms, and $R_5$ and $R_6$ each represents H.

6. An ester according to claim 2, wherein Formula II is a bis-(4-hydroxyphenyl) compound, $R_3$ and $R_4$ represent $C_2$–$C_8$ alkyl, and $R_5$ and $R_6$ each represents H.

7. An ester according to claim 3, wherein Formula II is a bis-(4-hydroxyphenyl) compound, $R_3$ and $R_4$ represent $C_2$–$C_8$ alkyl, and $R_5$ and $R_6$ each represents H.

8. An ester according to claim 2, wherein a 2-hydroxyethoxy group is substituted for each hydroxyl group in the compounds of formulae II, IIIa, and IIIb.

9. An ester according to claim 8, wherein Formula II is a bis-(4-hydroxyphenyl) compound, $R_3$ and $R_4$ represent $C_2$–$C_8$ alkyl, and $R_5$ and $R_6$ each represents H.

10. A polyolefin composition comprising a stabilizing amount of an ester according to claim 1.

11. A polyolefin composition according to claim 10, wherein the polyolefin is polyethylene or polypropylene.

12. A method of stabilizing polyolefins comprising adding to a polyolefin composition a stabilizing quantity of an ester, according to claim 1.

13. A method according to claim 1, wherein the polyolefin is polyethylene or polypropylene.

14. A method of stabilizing polyolefins comprising adding to a polyolefin composition a stabilizing quantity of an ester, according to claim 4.

15. An ester of claim 1, in which the oxethylate group is an oxethylate of formula II.

16. An ester of claim 1, in which the oxethylate group is an oxethylate of formula IIIa.

17. An ester of claim 1, in which the oxethylate group is an oxethylate of formula IIIb.

18. An ester of claim 15, which is bis-[3-(3,5-di-tert-butyl-4-hydroxyphenyl)-propionic acid]-ester of 1,1-bis-[4'-(2"-hydroxyethoxy)-phenyl]-cyclododecane.

* * * * *

UNITED STATES PATENT AND TRADEMARK OFFICE
CERTIFICATE OF CORRECTION

PATENT NO. : 4,912,249

DATED : March 27, 1990

INVENTOR(S) : FRIEDRICH-WILHELM KUPPER ET AL

It is certified that error appears in the above-identified patent and that said Letters Patent is hereby corrected as shown below:

Title page, Title, field [54]:

reads "ESTERS OF 3-TERT-BUTYL OR 3-TERT-BUTYL-5-ALKYL-4-HYDROXYL-PHENYL-(ALKANE) CARBOXYLIC ACIDS"

should read -- ESTERS OF 3-TERT-BUTYL OR 3-TERT-BUTYL-5-ALKYL-4-HYDROXYPHENYL-(ALKANE) CARBOXYLIC ACIDS WITH OXETHYLATES OF BIS- (4- OR 2-HYDROXYPHENYL) ALKANES, OXIDES, SULFIDES AND SULFONES, OF TRIS-(4-HYDROXYPHENYL) ALKANES AND OF 1,3,5-TRIS-(4-HYDROXYPHENYL ISOPROPYLIDENE) ARYLS --

Signed and Sealed this

Twenty-fifth Day of June, 1991

Attest:

HARRY F. MANBECK, JR.

Attesting Officer    Commissioner of Patents and Trademarks